United States Patent
Isaji et al.

(10) Patent No.: US 7,222,690 B2
(45) Date of Patent: May 29, 2007

(54) AWAKENING DEGREE DETERMINING SYSTEM

(75) Inventors: Kazuyoshi Isaji, Kariya (JP); Naohiko Tsuru, Handa (JP)

(73) Assignee: Denso Corporation, Kariya (JP)

(*) Notice: Subject to any disclaimer, the term of this patent is extended or adjusted under 35 U.S.C. 154(b) by 407 days.

(21) Appl. No.: 10/974,855

(22) Filed: Oct. 28, 2004

(65) Prior Publication Data

US 2005/0126841 A1    Jun. 16, 2005

(30) Foreign Application Priority Data

Dec. 10, 2003 (JP) .............................. 2003-412267

(51) Int. Cl.
*B60K 28/02* (2006.01)
*G08B 23/00* (2006.01)
*B60K 28/00* (2006.01)

(52) U.S. Cl. ............... 180/272; 340/439; 340/575; 340/576; 701/1; 701/36; 701/45; 701/96; 180/271

(58) Field of Classification Search .............. 180/271, 180/272, 282, 283, 274; 340/439, 575, 576; 701/1, 36, 96
See application file for complete search history.

(56) References Cited

U.S. PATENT DOCUMENTS

| | | | | |
|---|---|---|---|---|
| 5,465,079 A * | 11/1995 | Bouchard et al. | ............ | 340/576 |
| 5,642,093 A * | 6/1997 | Kinoshita et al. | ............ | 340/439 |
| 5,821,860 A * | 10/1998 | Yokoyama et al. | ......... | 340/576 |
| 6,393,361 B1 * | 5/2002 | Yano et al. | ................. | 701/301 |
| 6,470,241 B2 * | 10/2002 | Yoshikawa | ..................... | 701/1 |
| 6,522,969 B2 * | 2/2003 | Kannonji | ..................... | 701/96 |
| 6,696,929 B2 * | 2/2004 | Igaki et al. | ................. | 340/435 |
| 6,925,425 B2 * | 8/2005 | Remboski et al. | .......... | 702/188 |
| 6,975,932 B2 * | 12/2005 | Obradovich | ................. | 701/96 |
| 7,034,697 B2 * | 4/2006 | Oyama | ..................... | 340/575 |
| 7,038,577 B2 * | 5/2006 | Pawlicki et al. | ............ | 340/435 |
| 7,079,927 B1 * | 7/2006 | Tano et al. | .................. | 701/35 |
| 7,102,496 B1 * | 9/2006 | Ernst et al. | ................. | 340/436 |
| 7,149,653 B2 * | 12/2006 | Bihler et al. | ................. | 702/182 |
| 2002/0101337 A1 * | 8/2002 | Igaki et al. | ................. | 340/436 |
| 2004/0080422 A1 * | 4/2004 | Oyama | ..................... | 340/576 |
| 2005/0087381 A1 * | 4/2005 | Tobata | ..................... | 180/271 |
| 2005/0099279 A1 * | 5/2005 | Forbes et al. | .............. | 340/435 |
| 2005/0134440 A1 * | 6/2005 | Breed | ......................... | 340/435 |
| 2005/0143884 A1 * | 6/2005 | Bihler et al. | .................. | 701/36 |
| 2005/0273215 A1 * | 12/2005 | Kuge | ............................ | 701/1 |
| 2007/0027583 A1 * | 2/2007 | Tamir et al. | .................. | 701/1 |

FOREIGN PATENT DOCUMENTS

| | | |
|---|---|---|
| JP | A-08-197977 | 8/1996 |
| JP | H-11-227489 | 8/1999 |
| JP | A-2003-267173 | 9/2003 |

* cited by examiner

*Primary Examiner*—Ruth Ilan
*Assistant Examiner*—Joseph Rocca
(74) *Attorney, Agent, or Firm*—Posz Law Group, PLC

(57) ABSTRACT

When a variation amount of a driving operation falls outside of a determining reference, a determining system determines that an awakening degree of a driver is decreased. The determining system changes the determining reference by whether or not a preceding vehicle is existing within a given distance. Therefore, in consideration of peripheral traffic environments such as existence and absence of the preceding vehicle, the awakening degree of the driver is determined, so that determining accuracy of the awakening degree is enhanced more than that of a conventional method.

16 Claims, 6 Drawing Sheets

AWAKENING DEGREE DETERMINING SYSTEM

CROSS REFERENCE TO RELATED APPLICATIONS

This application is based on and incorporates herein by reference Japanese Patent Application No. 2003-412267 filed on Dec. 10, 2003.

FIELD OF THE INVENTION

The present invention relates to an awakening degree determining system that determines an awakening degree of a driver on a vehicle.

BACKGROUND OF THE INVENTION

Dozing while driving or inattentive driving is derived from a decreased awakening degree of a driver on a vehicle. The decreased awakening degree potentially occurs a serious traffic accident. Therefore, various awakening degree determining systems have been proposed.

For instance, in Patent document 1, enhancing accuracy of an awakening degree determining system is proposed. Here, moving integration values with respect to vehicle behavior detection data such as a steering angle are obtained during a learning period for which a vehicle speed is stabilized to thereby stabilize operating conditions. A threshold value used for determining the awakening degree is then determined based on an average or standard deviation computed from the obtained moving integration values. Obtaining of the moving integration values is continued even after the threshold value is determined. Thereafter, when a value exceeds the threshold value, dozing while driving is determined. Thus, in Patent document 1, deviations of integration values are decreased by obtaining the moving integration values to thereby enhance accuracy of determining of the dozing while driving.

Patent document 1: JP-H11-227489A

Obtaining the moving integration values of the vehicle behavior detection data, described in Patent document 1, is effective in decreasing the deviations of variation of the detected vehicle behavior. However, the vehicle behavior is affected by peripheral traffic environments while the vehicle is actually driven. In particular, the vehicle behavior is clearly differentiated by whether a preceding vehicle is existing or not. Conventional systems such as the system described in Patent document 1 do not consider the influence to the vehicle behavior due to the peripheral traffic environments. This restricts increase of the accuracy for determining the awakening degree of a driver.

SUMMARY OF THE INVENTION

It is an object of the present invention to provide an awakening degree determining system where accuracy for determining an awakening degree of a driver on a vehicle can be enhanced by considering traffic environments surrounding the vehicle.

To achieve the above object, an awakening degree determining system mounted in a vehicle is provided with the following. A vehicle behavior or a driver's driving operation that varies the vehicle behavior is detected. A variation state of the detected vehicle behavior or driving operation is obtained. Decrease in an awakening degree of the driver is determined based on a comparison result between the obtained variation state and a reference. The reference is changed based on whether a preceding vehicle is detected or not.

When a preceding vehicle is existing ahead of a subject vehicle, the subject vehicle undergoes the limitation due to the preceding vehicle. The vehicle behavior of the subject vehicle or driving operation under a condition where the subject vehicle travels to follow the preceding vehicle is thereby differentiated from that under a condition where the subject vehicle singly travels without seeing the preceding vehicle. When this difference is considered, determining accuracy of the awakening degree of a driver can be enhanced. In the above-described structure of the present invention, the reference for determining an awakening degree is changed based on whether a preceding vehicle is detected or not. Therefore, the awakening degree is determined upon considering an influence of a peripheral traffic environment of whether the preceding vehicle is existing or not. Consequently, the accuracy for determining the awakening degree of a driver can be increased in comparison to the conventional methods.

In another aspect of this invention, an awakening degree determining system mounted in a vehicle is provided with the following. A vehicle behavior or a driver's driving operation that varies the vehicle behavior is detected. A variation state of the detected vehicle behavior or driving operation is obtained. Decrease in an awakening degree of the driver is determined based on a comparison result between the obtained variation state and a reference. The reference is set based on the variation state of the vehicle behavior or driving operation that is detected while the driver actually drives. The reference includes a first reference under a first condition where a preceding vehicle is detected and a second reference under a second condition where a preceding vehicle is not detected.

In this structure, the reference is set based on the variation state of the vehicle behavior or driving operation that is actually detected while the driver drives the vehicle, so that the determining reference reflects a characteristic of the driving of the driver. Further, the determining reference includes a first reference under a condition where a preceding vehicle is existing and a second reference under a condition where no preceding vehicle is existing, so that the determining reference can be set according to each of the first and second conditions.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Awakening degree determining systems according to embodiments of the present invention will be explained below. Explanation in the embodiments will be done regarding drive assisting systems including the awakening degree determining system of the present invention.

(First Embodiment)

Figure 1:
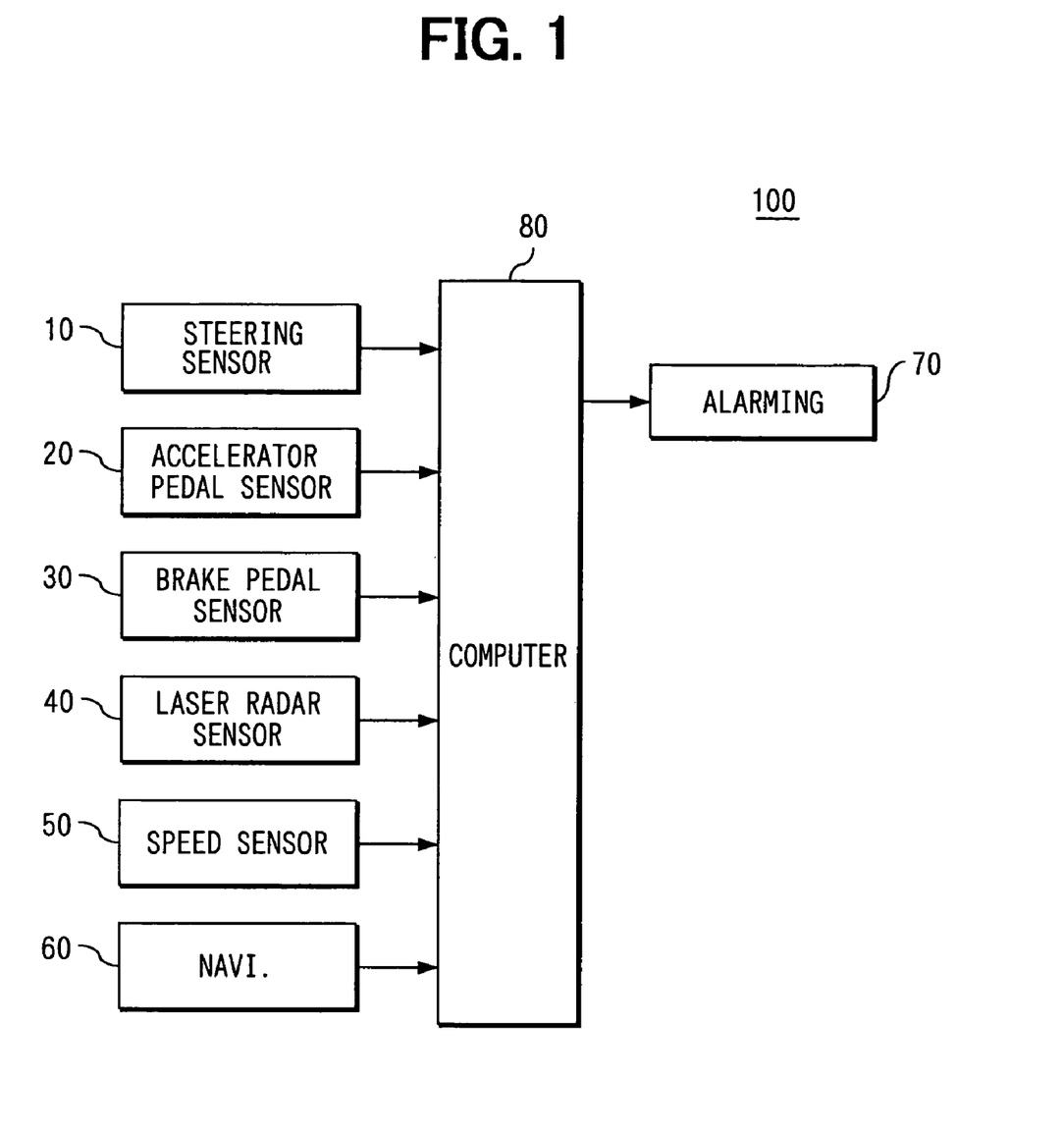
FIG. 1 is a block diagram of a schematic structure of a drive assisting system including an awakening degree determining system according to a first embodiment of the present invention.

FIG. 1 shows a schematic overall structure of a drive assisting system 100 mounted in a (subject) vehicle according to a first embodiment. The drive assisting system 100 includes a steering sensor 10, an accelerator pedal sensor 20, a brake pedal sensor 30, a laser radar sensor 40, a vehicle speed sensor 50, a navigation device 60, an alarming device 70, and a computer 80 to which the foregoing sensors or the like are connected.

The computer 80 includes an input and output (I/O) interface (not shown) and various driving circuits (not shown). Hardware structure of the computer 80 is known, so that its explanation is eliminated here. The computer 80 determines whether an awakening degree of a driver is decreased or not based on a variation state of a driving operation that is performed by the driver and affects a vehicle behavior. When the awakening degree is determined to be decreased, warning is outputted to enhance the awakening degree of the driver. Thus, drive assisting is performed to prevent the driving under the state where the awakening degree of the driver is decreased.

The steering sensor 10 detects a variation amount of a steering angle, and computes the steering angle from the detected values to output it to the computer 80. The accelerator pedal sensor 20 detects an operation amount of an accelerator pedal by the driver and sends the detected operation signals of the accelerator pedal to the computer 80. The brake pedal sensor 30 detects an operation amount of the brake pedal by the driver and sends the detected operation signals of the operation amount to the computer 80. Thus, the driving operation that affects the vehicle behavior is detected by each of these sensors.

The laser radar sensor 40 radiates laser light within a given range forwards of the (subject) vehicle and detects, based on the reflected light by a reflecting object, a distance to the reflecting object, a relative speed with the reflecting object, an orientation of the reflecting object with respect to the subject vehicle, a size of the reflecting object etc. These detection results every each reflecting object are outputted to the computer 80. The computer 80 recognizes a preceding vehicle based on the size of the reflecting object, the orientation of the reflecting object etc. The computer 80 changes a determining reference that is used for determining that the awakening degree is decreased based on whether or not the preceding vehicle is existing within a given distance from the subject vehicle. The laser radar 40 detects an object with the laser light; however, instead of the laser light, radio waves such as milli-meter waves or micro waves, or ultrasonic can be used.

The vehicle speed sensor 50 is disposed, for instance, near a wheel for outputting a speed signal corresponding to a rotation speed of the wheel to input the speed signal to the computer 80. The computer 80 computes a vehicle speed based on the inputted speed signal.

The navigation device 60 detects, as is generally known, a current position of the subject vehicle to perform various functions such as a map displaying function for displaying a map surrounding the current position of the subject vehicle, a peripheral entity retrieving function for retrieving a peripheral entity, and a routing assistance function for indicating a route to a destination.

This navigation device 60 includes a position detecting unit, a map-data input unit, a VICS (Vehicle Information and Communication System) receiver, all of which are not shown. The position detecting unit includes known sensors such as a GPS (Global Positioning System) receiver to detect the current position of the subject vehicle based on the radio waves received from satellites by the GPS receiver, an electromagnetism sensor, a gyroscope, a distance sensor and the like. These have individually different errors, so that they are combined to complement one another. Depending on the accuracy of the sensors or the like, the position detecting unit can be constituted by some of the above sensors.

The map-data input unit is for inputting map data. The map data is stored in a storage medium such as a CD-ROM, or DVD-ROM because of the data volume of the map data; however, a rewritable storage medium such as a memory card, a hard disk can be used for storing the map data.

Here, the detail of the map data will be explained below. The map data is constructed mainly of link data and node data. A road on a map is divided by nodes such as an intersection, a branching point, a junction. A link of the link data is defined as a road portion between two of the nodes.

The link data includes: a unique number (link ID) for identifying a link; a link length for indicating the length of the link; coordinates (longitudes and latitudes) of a starting node and terminating node of the link; a road name; a road width; a road type such as an expressway, nation road, prefecture road, city road; and a speed limit.

The node data includes: a node ID that is uniquely assigned to a node; coordinates of the node; a node name; a connection ID that includes the link IDs of the entire links connected with the node; an intersection type.

The VICS receiver receives road traffic information from a center of the VICS (Vehicle Information and Communication System) via a FM station or a road-side beacon installed in the road. The road traffic information includes congestion information such as a congested area and a congestion degree, and traffic regulation information such as traffic closure.

The alarming device 70 generates an alarm as a warning based on the command from the computer 80. The computer 80 commands the alarming device 70 to generate an alarm to the driver to thereby increase the awakening degree of the driver when the awakening degree of the driver is determined to be decreased. To increase the awakening degree of the driver, instead of the alarming device 70, an air-conditioner installed on the vehicle can be used. For instance, blowing of cool air to the driver or emitting of fragrance having an effect for decreasing drowsiness from an outlet of the air-conditioner can be adopted.

Next, a determining process for determining the decrease in the awakening degree will be explained below in detail with reference to a flow chart diagram in FIG. 2. This process is executed by the computer 80.

At Step S10, respective sensor signals are retrieved from the steering sensor 10, accelerator pedal sensor 20, brake pedal sensor 30, laser radar sensor 40, and vehicle speed sensor 50.

At Step S20, it is determined whether a vehicle speed that is computed from the sensor signal of the vehicle speed sensor 50 is zero, i.e., whether the subject vehicle is stopping or not. When the vehicle is stopping, the awakening degree cannot be determined by a driving operation by the driver. The sequence thereby returns to Step S10. By contrast, when the vehicle speed is determined to be not zero, the sequence advances to Step S30.

At Step S30, it is determined whether a preceding vehicle is existing within a given distance from the subject vehicle based on the sensor signal from the laser radar sensor 40. When the preceding vehicle is determined to be existing, the sequence advances to Step S40, where a first determining reference that is previously set is selected as a determining reference for determining the awakening degree. By contrast, when the preceding vehicle is determined to be not existing, the sequence advances to Step S50, where a second determining reference that is also previously set is selected as the determining reference for determining the awakening degree.

Figure 3A:
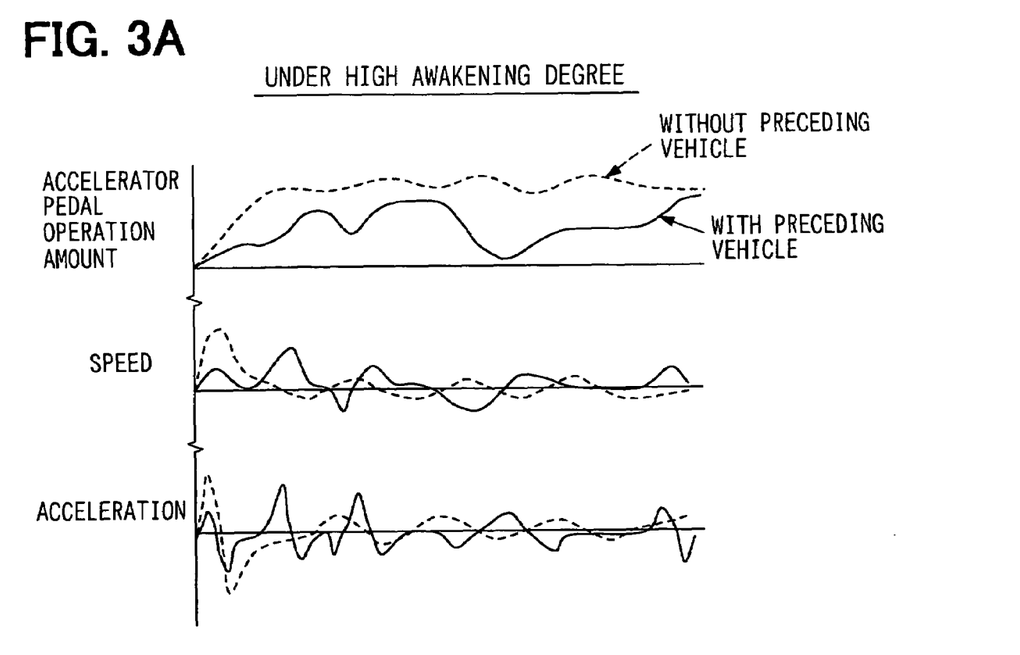
FIG. 3A is a time-series chart diagram of, under a high awakening degree, an operation amount of accelerator pedal, a corresponding operation speed, and a corresponding operation acceleration, under two conditions where a vehicle singly travels without seeing a preceding vehicle and where a vehicle travels to follow a preceding vehicle.
Figure 3B:
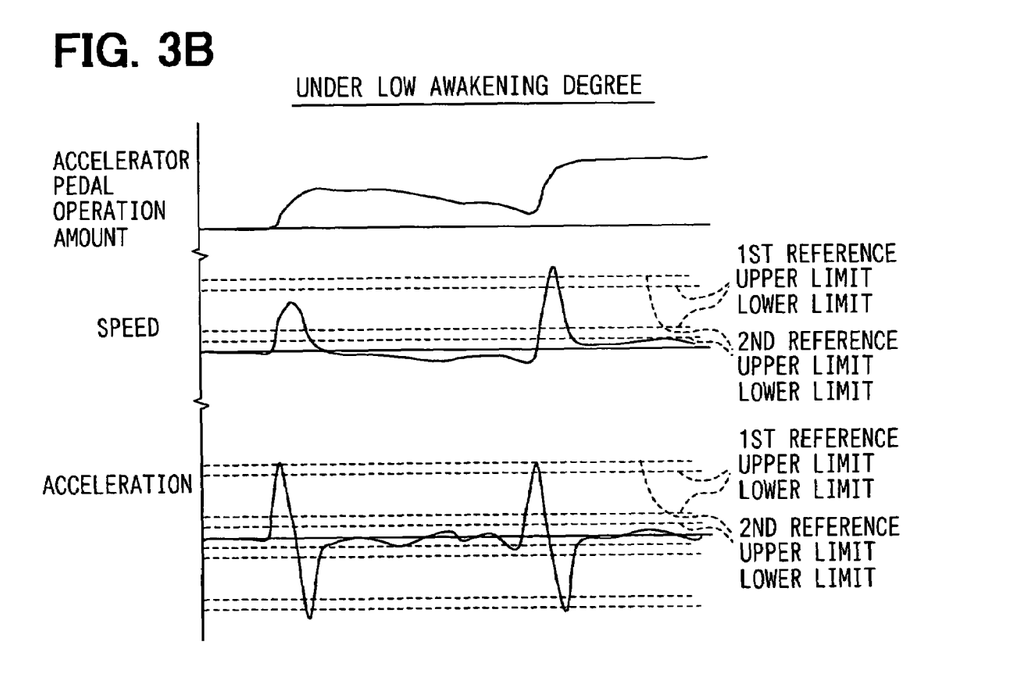
FIG. 3B is a time-series chart diagram of an operation amount of accelerator pedal, a corresponding operation speed, and a corresponding operation acceleration under a low awakening degree, under a condition where a vehicle travels to follow a preceding vehicle.

Examples of the first and second determining references will be explained with reference to FIGS. 3A, 3B. FIG. 3A shows a time-series chart diagram of an operation amount of an accelerator pedal, an operation speed of the accelerator pedal, and an operation acceleration of the accelerator pedal, under a high awakening degree, in both conditions where the subject vehicle singly travels without seeing a preceding vehicle (singly traveling) and where the subject vehicle travels to follow a preceding vehicle (following traveling). Here, a dotted line shows the condition where no preceding vehicle is existing, while a solid line shows the condition where a preceding vehicle is existing. FIG. 3B shows a time-series chart diagram of an operation amount of an accelerator pedal, an operation speed of the accelerator pedal, and an operation acceleration of the accelerator pedal, under a low awakening degree, under a condition where the subject vehicle travels to follow a preceding vehicle.

Here, under the high awakening degree of the driver, when the vehicle singly travels, the driver maintains a vehicle speed at a proper speed by operating the accelerator pedal or brake pedal, while operating the steering wheel to maintain the vehicle position within a traffic lane. Under this condition, the driver can accelerate or decelerate the vehicle according to the proper speed with relatively large liberty since no limitation due to the preceding vehicle exists.

However, even when the vehicle follows the preceding vehicle under the high awakening degree of the driver, the operation amounts of the accelerator pedal, brake pedal, and steering wheel are varied relatively finely in the actual driving. For instance, as shown in the dotted lines in FIG. 3A, the driver ceaselessly performs relatively fine modification without maintaining the constant operation amount, so as to control the vehicle speed at the proper speed. This is similarly found with respect to the operation amounts of the brake pedal and steering wheel.

Further, when the preceding vehicle is existing, unlike the single traveling, the driver cannot accelerate or decelerate the subject vehicle according to the proper speed withberty. Namely, the traveling state of the subject vehicle is limited by the existence of the preceding vehicle. Typically, the driver more finely varies the operation amounts of the accelerator pedal, brake pedal, and steering wheel to follow the preceding vehicle.

Consequently, in both single traveling and following traveling, the awakening degree of the driver can be determined to be decreased under the following conditions. Namely, the condition is that a variation amount of the operation amount for performing modification becomes excessively small, or the condition is that a variation amount of the operation amount for performing the modification becomes excessively large because of failing in performing the modification up to that point.

For instance, suppose that the preceding vehicle is existing and the awakening degree of the driver is decreased. Further suppose that operation of stepping upon the accelerator pedal is delayed even when the speed of the preceding vehicle is accelerated. The distance to the preceding vehicle consequently becomes large. As shown in FIG. 3B, the driver of the subject vehicle strongly thereafter steps upon the accelerator pedal to at once shorten the enlarged distance to the preceding vehicle. This exhibits a typical driving operation pattern under the decreased awakening degree of the driver. Namely, the variations of the operation amounts of the accelerator pedal or the like become small until the driver recognizes the traveling-state change in the preceding vehicle. By contrast, the variations of the operation amounts are largely increased when the driver recognizes the traveling-state change in the preceding vehicle.

In this embodiment, for instance, as shown in FIG. 3A, the variation state (variation amount) of the operation amount of the accelerator pedal is obtained as an operation speed of the accelerator pedal or an operation acceleration of the accelerator pedal. The obtained variation state is then compared to a determining reference of the upper limit and lower limit. When the variation state is deviated from a region defined by the upper limit and lower limit, the awakening degree of the driver is determined to be decreased. Here, as shown in FIG. 3B, the operation acceleration has the upper and lower limits in both positive and negative ranges.

Further, the decreased awakening degree can be determined based on the variation states of the operation amounts of the multiple driving operations (e.g., accelerator operation, brake operation, steering operation). Here, the determining reference corresponding to each of the multiple variation state can be compared to each upper or lower limit of the determining reference. Further, the awakening degree of the driver can be determined based on the typical driving operation pattern that takes place when the awakening degree is decreased. Namely, when the operation variation is kept under the lower limit for a given period and then the operation variation is increased to and over the upper limit, the awakening degree of the driver can be determined. Thus, the accuracy for determining the awakening degree can be enhanced more.

Here, with respect to the accelerator operation and the brake operation, the variation state is compared to the upper or lower limit only while the driver is operating. For instance, the braking operation does not take place while the accelerator operation takes place, while the accelerator operation does not take place while the braking operation takes place. When the operation itself is not performed, the operation amount naturally becomes zero. Comparison to the upper or lower limit is not executed.

Further, in this embodiment, when the preceding vehicle is existing, a first determining reference is selected. By contrast, when the preceding vehicle is not existing, a second determining reference is selected. This enables the awakening degree is performed by using the more proper determining references.

In detail, as shown in FIG. 3B, the upper limit of the first determining reference is set to smaller than that of the second determining reference, while the lower limit of the first determining reference is set to larger than that of the second determining reference. This is derived from the consideration of the tendency shown in FIG. 3A. Namely, the modification of the vehicle speed or steering angle is more frequently executed in the following traveling than that in the single traveling. On the other hand, as the result of the frequent modification in the following traveling, the amount of the variations becomes smaller than that in the single traveling. Further, both the upper and lower limits do not need simultaneously changed, but either of them can be changed.

Further, the upper limits and lower limits of the first and second determining references with respect to each of the operation amounts of the accelerator pedal, brake pedal, and steering wheel are previously determined and memorized by experiments or the like. The variation state of the steering wheel can be also obtained from a distribution of the operation amount from a neutral position, in addition to the operation speed or operation acceleration.

At Step S40 or Step S50, the first determining reference or second determining reference is selected, respectively. The sequence then advances to Step S60, where each of the variation states of the sensor signals is compared to the corresponding upper and lower limits. As a result of this comparison, when the relevant variation state is deviated from the region defined by the corresponding upper and lower limits, the awakening degree of the driver is determined to be decreased at Step S70. In this case, the sequence advances to Step S80, where the alarming process is activated. In the alarming process, the alarming device 70 generates an alarm for enhancing the awakening degree of the driver. By contrast, when the awakening degree of the driver is determined to be not decreased at Step S70, the sequence returns to Step S10 for repeating the above process.

(Second Embodiment)

Figure 4:
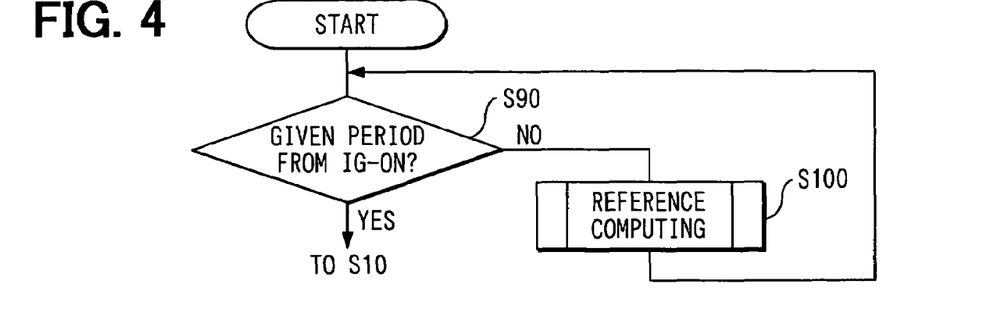
FIG. 4 is a flow chart explaining a process for determining starting of a reference computing process according to a second embodiment of the present invention.

Next, a drive assisting system according to a second embodiment will be explained with reference to FIGS. 4, 5. The overall structure of the drive assisting system of this embodiment is the same as that of the first embodiment, so that the explanation is eliminated here.

In the first embodiment, the first and second determining references are previously determined and either of the first and second determining references is selected by whether the preceding vehicle is existing or not. However, since a characteristic of the driving operation is varied depending on a driver, the fixed determining reference sometimes results in missing of the proper determination for the awakening degree of a driver.

Therefore, in this embodiment, the upper and lower limits of the determining reference is determined based on an average that is computed from variation state of the driving operation while the driver is actually driving the subject vehicle. This enables the determining reference considering the characteristic of the relevant driver, so that the awakening degree of the driver can be enhanced.

The featured parts of this embodiment will be explained below with reference to FIGS. 4, 5. FIG. 4 is a flow chart explaining a process for determining starting of a reference computing process according to the second embodiment.

Figure 5:
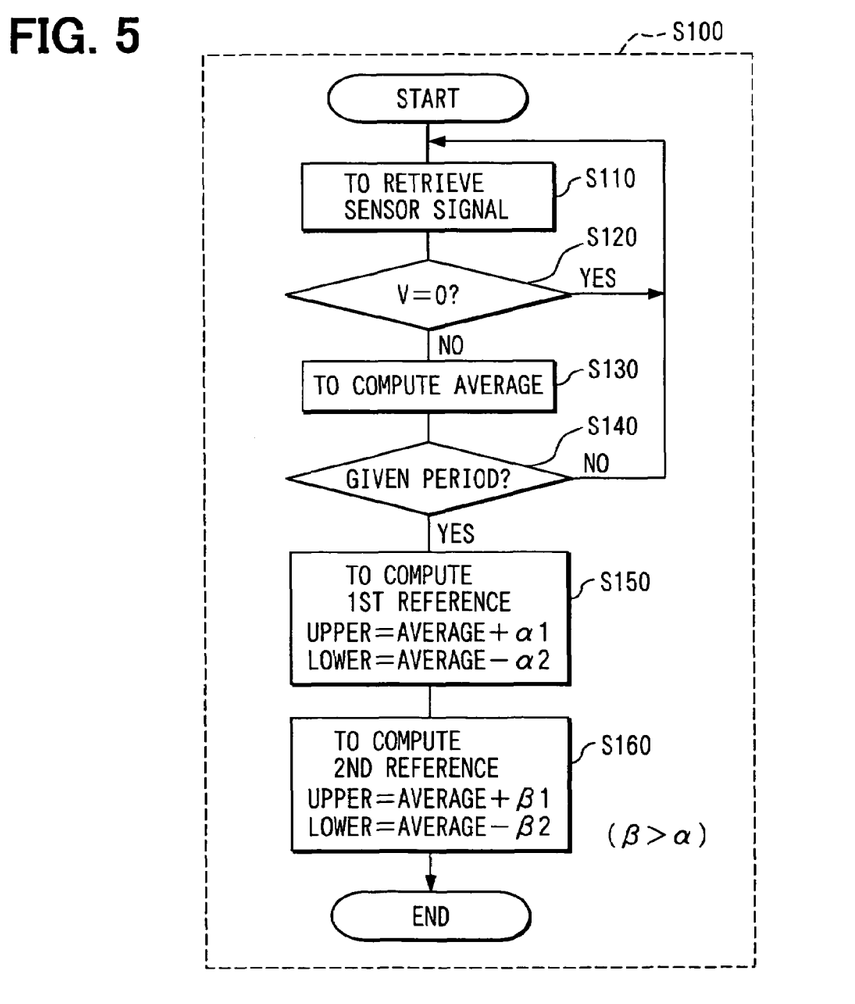
FIG. 5 is a flow chart explaining a determining reference computing process according to the second embodiment.

FIG. 5 is a flow chart explaining a reference computing process according to the second embodiment.

At Step S90, it is determined whether or not a given period passes from when an ignition switch of the vehicle is turned on. When the given period is determined to be not passing, a determining reference computing process is started at Step S100. This is because the high awakening degree of the driver is expected to be still maintained for this given period that starts from turning on of the ignition switch. Under this high awakening degree, the upper and lower limits of the determining reference are computed from an average for the variation state of the actual driving operation, so that the decrease in the awakening degree can be determined with high accuracy.

Figure 2:
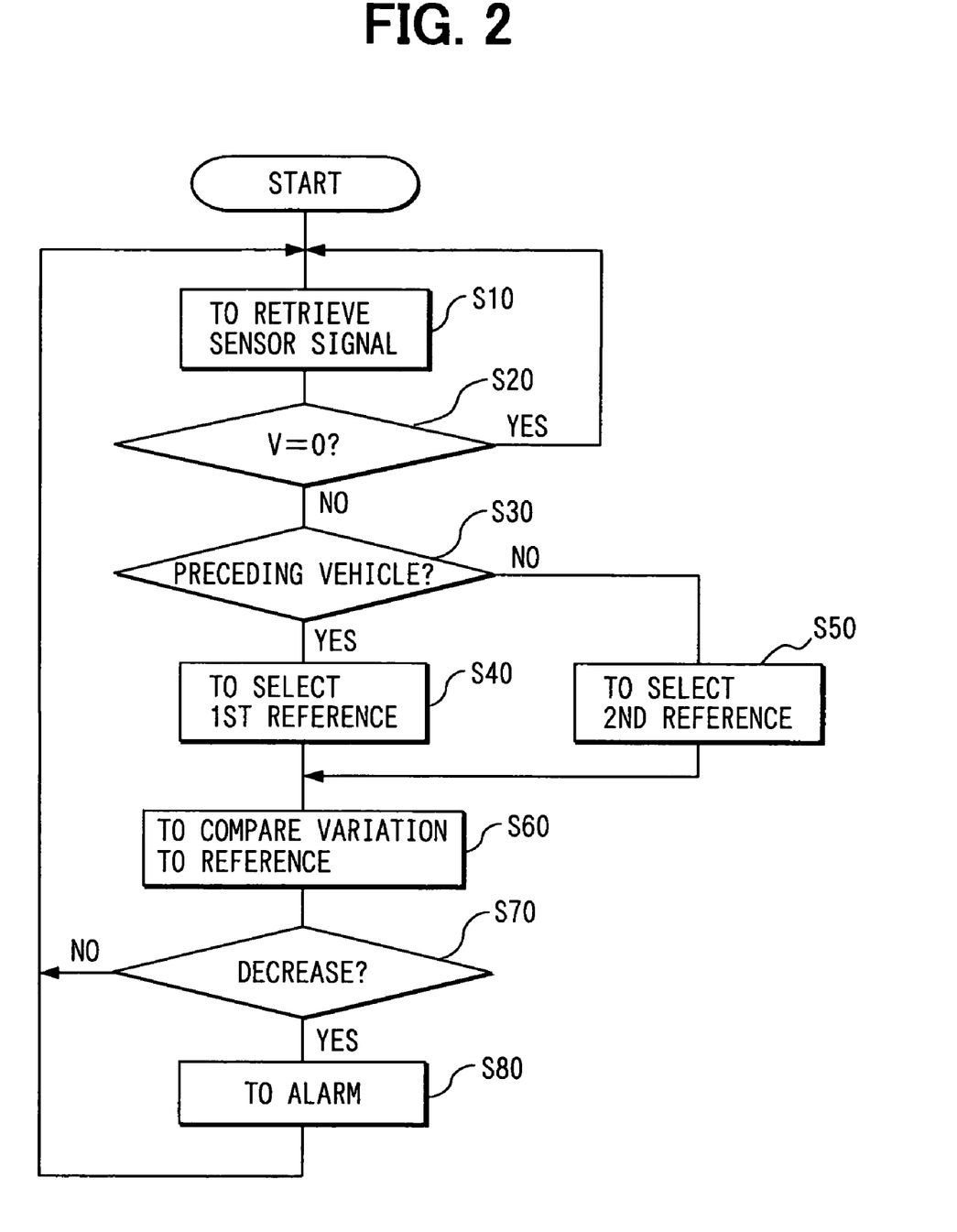
FIG. 2 is a flow chart explaining a determining process for determining decrease in an awakening degree according to the first embodiment.

By contrast, at Step S90, when the given period is determined to be passing, the sequence advances to Step S10 in the flow chart in FIG. 2.

Next, the determining reference computing process will be explained with reference to FIG. 5. Firstly, at Step S110, sensor signals are retrieved from the respective sensors. At Step S120, it is determined whether a vehicle speed V is zero. When the vehicle speed V is zero, the sequence returns to Step S110. Steps S110, S120 are the same as Steps S10, S20 in the flowchart in FIG. 2.

At Step S130, respective averages for variation amounts of the sensor signals are computed. The averages can be obtained by a simple average method or a weighted average method. At Step 140, it is determined whether the above given period passes or not. When the given period is determined to be not passing, the sequence returns to Step S110. By contrast, when the given period is determined to be passing, the sequence advances to Step S150. Here, the first determining reference under a condition where the preceding vehicle is existing is computed. In detail, for instance, with respect to a certain average of the averages computed at Step S130, a predetermined value $\alpha 1$ is added to obtain the upper limit, while a predetermined value $\alpha 2$ is subtracted to obtain the lower limit.

Next, at Step S160, the second determining reference under a condition where the preceding vehicle is not existing is computed. In detail, for instance, with respect to the certain average of the averages computed at Step S130, a predetermined value $\beta 1$ is added to obtain the upper limit, while a predetermined value $\beta 2$ is subtracted to obtain the lower limit. Here, the relationships between the predetermined values $\alpha 1$, $\alpha 2$, $\beta 1$, $\beta 2$ are $\beta 1 > \alpha 1$, and $\beta 2 > \alpha 2$.

As explained above, in the second embodiment, in the determining reference computing process, the determining reference suitable for each driver can be computed.

(Third Embodiment)

Figure 6:
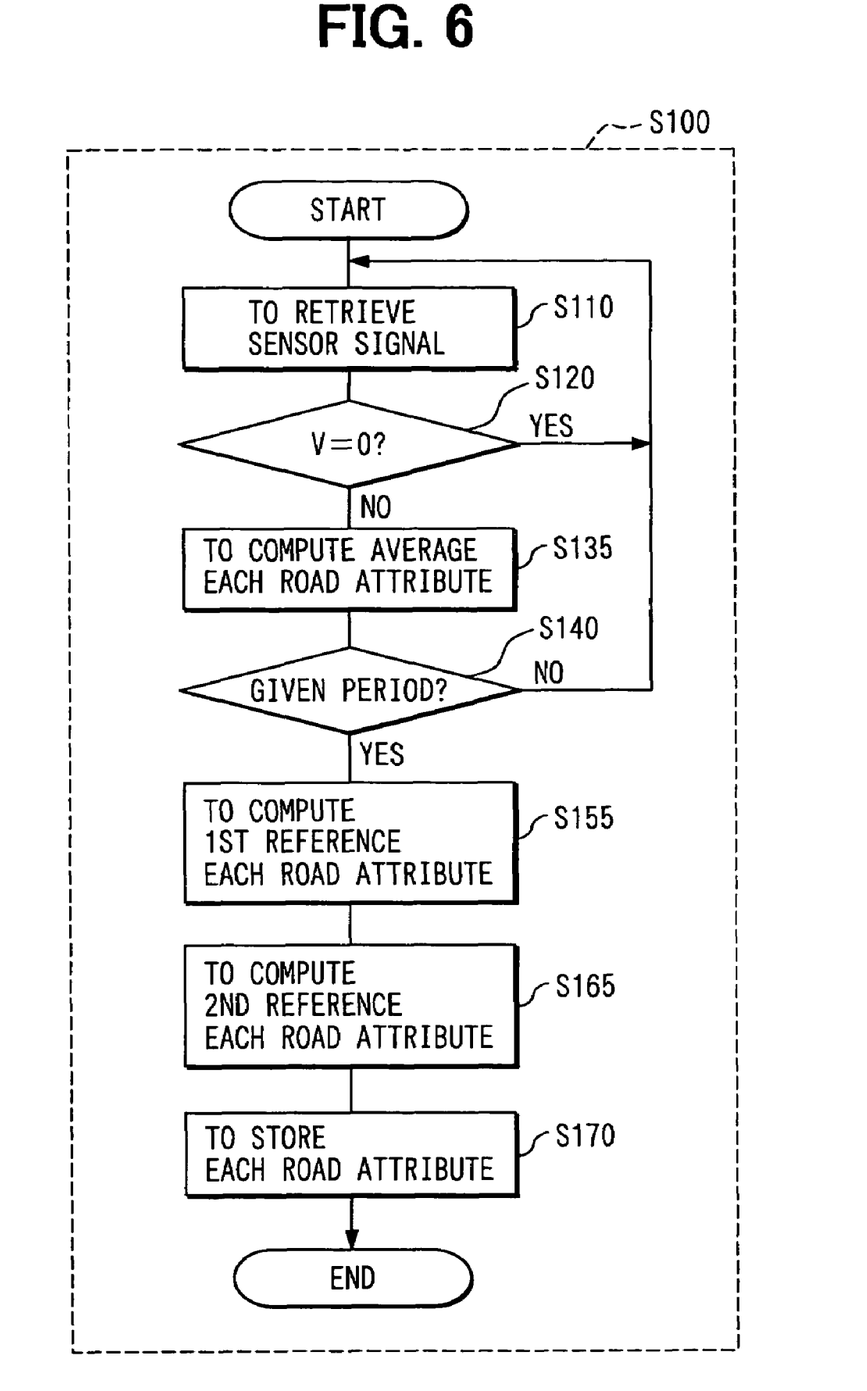
FIG. 6 is a flow chart explaining a determining reference computing process according to a third embodiment of the present invention.

Next, a drive assisting system according to a third embodiment will be explained with reference to FIG. 6. The overall structure of the drive assisting system of this embodiment is also the same as that of the first embodiment, so that the explanation is eliminated here.

The feature of the third embodiment is that, when the first and second determining references are computed with the same method as that of the second embodiment, the first and second determining references are computed while being classified based on road attributes. When the road attribute such as a road type of an expressway, a local road, etc; a road width; and a speed limit, is changed, variation states of the driving operations are changed. Computing the first and second determining references based on the road attribute thereby results in enhancement of the determining accuracy for the awakening degree.

The featured parts of this embodiment will be explained below with reference to FIG. 6 that is a flow chart explaining a determining reference computing process. Also in the determining reference computing process in FIG. 6, at Step S110, sensor signals are retrieved from the respective sensors, and, at Step S120, it is determined whether a vehicle speed V is zero. Steps S110, S120 are the same as Steps S10, S120 in the flowchart in FIG. 5.

Next, at Step S135, respective averages for variation amounts of the sensor signals are computed. Here, data of the road attribute of the road where the subject vehicle is traveling is obtained from the navigation device 60, and the respective averages for variation amounts of the sensor signals are then computed with respect to the obtained road attribute. Here, the road attribute includes as a classification attribute: a road type such as an expressway, nation road, prefecture road, city road etc.; a road width; and a speed limit. At Step S140, it is determined whether the given period passes or not. When the given period is determined to be not passing, the sequence returns to Step S110. By contrast, when the given period is determined to be passing, the sequence advances to Step S155.

At S155, the first determining references with respect to each of the entire obtained road attributes are computed by using the corresponding averages for the variation amounts. At S165, the second determining references with respect to each of the entire obtained road attributes are computed by using the corresponding averages for the variation amounts. Here, the first and second determining references using the averages are computed similarly to that of the second embodiment. At Step S170, the first and second determining references computed at Steps S155, S165 are classified with respect to each of the road attributes, and stored or updated.

Thus, computing the first and second determining references with respect to each of the road attributes results in proper computing for the determining reference.

Here, since after the given period passes on, the awakening degree of the driver is determined based on the first and second determining references corresponding to the road attribute. This road attribute is the most comparable to the road attribute obtained from the navigation device 60.

In the third embodiment, the averages for the variation amounts of the respective sensor signals are computed by being classified with respect to each of the road attributes. However, another method can be adopted. Namely, firstly, a common average for variation amounts with respect to the entire roads is computed. Secondly, predetermined values for addition and subtraction with respect to the common average to obtain the upper and lower determining references are changed according to each of the road attributes. By this method, the determining references with respect to the respective road attributes can be also computed. Here, the predetermined values for addition and subtraction need obtaining by experiments with respect to the respective road attributes.

(Fourth Embodiment)

Figure 7:
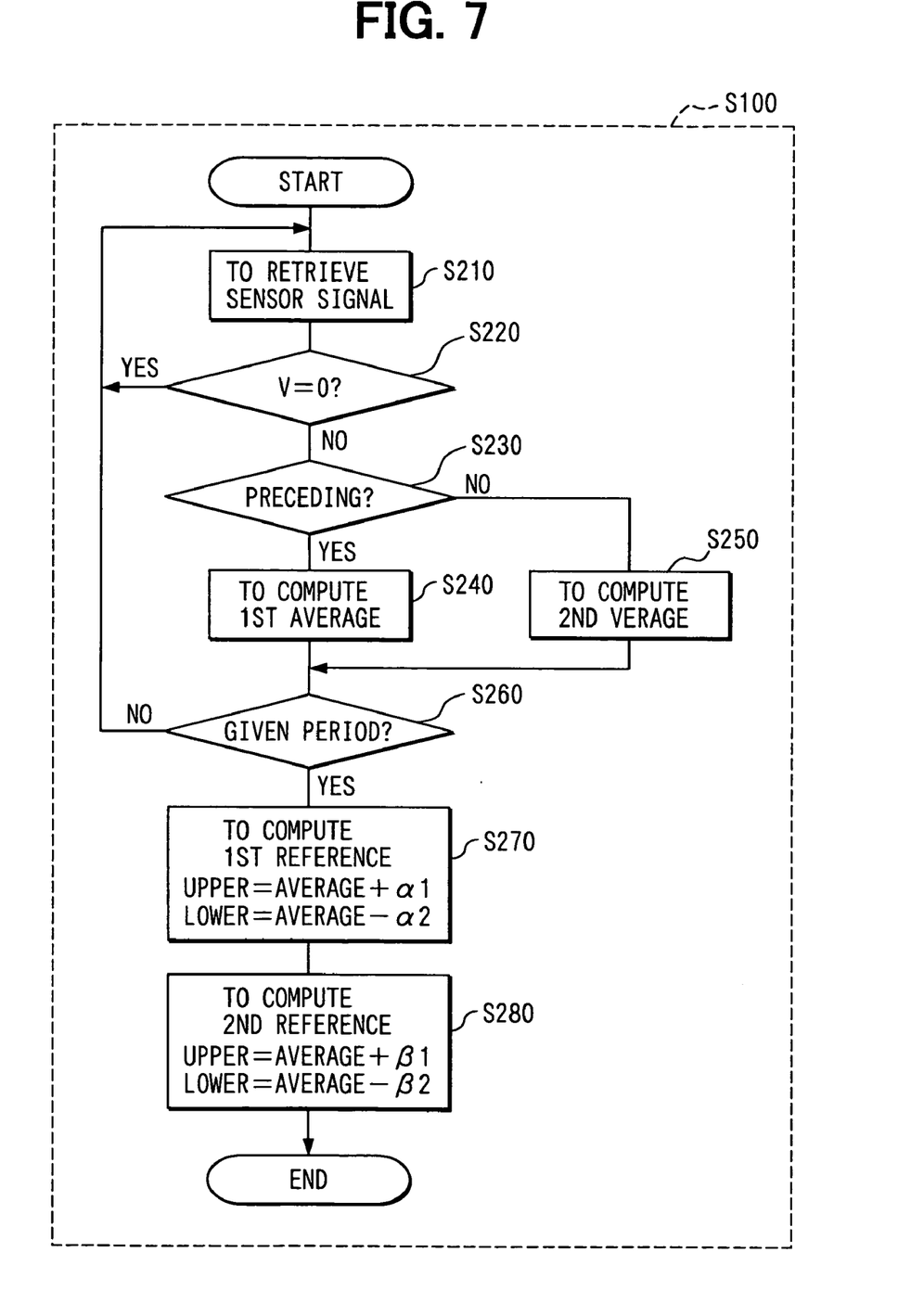
FIG. 7 is a flow chart explaining a determining reference computing process according to a fourth embodiment of the present invention.

Next, a drive assisting system according to a fourth embodiment will be explained with reference to FIG. 7. The overall structure of the drive assisting system of this embodiment is also the same as that of the first embodiment, so that the explanation is eliminated here.

The feature of the fourth embodiment is that the determining reference is computed by being classified into a first condition (following traveling) where the preceding vehicle is existing and a second condition (single traveling) where the preceding vehicle is not existing. Namely, firstly, with respect to the first condition and second condition, first and second averages for the variation states of the driving operations are computed. The first and second determining references are computed based on the first and second averages, respectively. Thus, in consideration of two conditions, i.e., the following traveling and single traveling, the individual averages for the variation states of the driving operations are computed. The first and second determining references are thereby computed in consideration of actual driving operations according to the respective conditions, i.e., whether the preceding vehicle is existing or not.

The featured parts of this embodiment will be explained below with reference to FIG. 7. FIG. 7 is a flow chart explaining a determining reference computing process. Also in the determining reference computing process in FIG. 7, at Step S210, sensor signals are retrieved from the respective sensors, and at Step S220, it is determined whether a vehicle speed V is zero. Steps S210, S220 are the same as Steps S110, S120 in the flowchart in FIG. 5.

Next, at Step S230, it is determined whether a preceding vehicle is existing within a given distance from the subject vehicle based on the sensor signal from the laser radar sensor 40. When the preceding vehicle is determined to be existing, the sequence advances to Step S240, where a first average is computed as each of averages for variation amounts of the sensor signals under the first condition, i.e., following traveling. By contrast, when the preceding vehicle is determined to be not existing, the sequence advances to Step S250, where a second average is computed as each of averages for variation amounts of the sensor signals under the second condition, i.e., single traveling.

At Step S260, it is determined whether the given period passes or not. When the given period is determined to be not passing, the sequence returns to Step S210. By contrast, when the given period is determined to be passing, the sequence advances to Step S270. Namely, for the given period starting from the turning on of the ignition switch, the variation amounts of the respective sensors are collected by being classified into the two conditions, and then averaged.

At Step S270, by using the first averages, the upper and lower limits of the first determining references under a condition where the preceding vehicle is existing is computed. Further, at Step S280, by using the second averages, the upper and lower limits of the second determining references under a condition where the preceding vehicle is not existing is computed. Thus computed first and second determining references can be stored and then used for the determining references after starting of the subsequent driving and/or further following drivings.

(Others)

In the above embodiments, the decrease in the awakening degree is determined based on the variation amounts of the driving operations (accelerator operation, brake operation, and steering operation) by the driver. However, instead of the driving operations, vehicle behaviors can be also used for determining the awakening degree. It is because the driving operation of the driver eventually affect the vehicle behaviors. The vehicle behaviors include, for instance, a yaw rate or a lateral (vehicle-width direction) acceleration varied by the steering operation, a longitudinal (vehicle-forward-rearward direction) acceleration varied by the accelerator operation or brake operation. Namely, the yaw rate sensor or acceleration sensor detects the yaw rate or lateral acceleration, or the longitudinal acceleration; then, based on the detected amounts, the decrease in the awakening degree of the driver can be determined.

It will be obvious to those skilled in the art that various changes may be made in the above-described embodiments of the present invention. However, the scope of the present invention should be determined by the following claims.

What is claimed is:

1. An awakening degree determining system mounted in a vehicle, the awakening degree determining system comprising:
   a detecting unit that detects at least one of a vehicle behavior and a driving operation of a driver on the vehicle, wherein the driving operation varies the vehicle behavior;
   an obtaining unit that obtains a variation state of the detected at least one of the vehicle behavior and the driving operation;
   a determining unit that determines decrease in an awakening degree of the driver based on a comparison result between the obtained variation state and a reference;
   a preceding vehicle detecting unit that detects a preceding vehicle; and
   a changing unit that changes the reference based on whether the preceding vehicle is detected or not.

2. The awakening degree determining system of claim 1,
   wherein the reference includes an upper limit of the variation state and a lower limit of the variation state,
   wherein the determining unit determines the decrease in the awakening degree when the obtained variation state falls outside a region between the upper limit and the lower limit, and
   wherein the changing unit changes at least one of the upper limit and the lower limit based on whether the preceding vehicle is detected or not.

3. The awakening degree determining system of claim 2,
   wherein the changing unit increases the lower limit under a condition where the preceding vehicle is detected in comparison to the lower limit under a condition where the preceding vehicle is not detected.

4. The awakening degree determining system of claim 2,
   wherein the changing unit decreases the upper limit under a condition where the preceding vehicle is detected in comparison to the upper limit under a condition where the preceding vehicle is not detected.

5. The awakening degree determining system of claim 2,
   wherein the determining unit computes an average for the obtained variation state, and sets the upper limit and lower limit based on the computed average.

6. The awakening degree determining system of claim 5,
   wherein the determining unit sets the upper limit and lower limit based on a road attribute.

7. The awakening degree determining system of claim 1,
   wherein the preceding vehicle detecting unit also detects a distance to the preceding vehicle, and
   wherein, when the distance falls within a given region, the changing unit recognizes that the preceding vehicle is detected.

8. The awakening degree determining system of claim 1,
   wherein the vehicle behavior includes at least one of a yaw rate, a vehicle-lateral acceleration, and a vehicle-longitudinal acceleration, and
   wherein the driving operation includes at least one of an accelerator operation, a brake operation, and a steering operation.

9. The awakening degree determining system of claim 1, further comprising:
   an awakening-degree enhancing unit that enhances the awakening degree of the driver when the determining unit determines the decrease in the awakening degree.

10. An awakening degree determining system mounted in a vehicle, the awakening degree determining system comprising:
    a detecting unit that detects at least one of a vehicle behavior and a driving operation of a driver on the vehicle, wherein the driving operation varies the vehicle behavior;
    an obtaining unit that obtains a variation state of the detected at least one of the vehicle behavior and the driving operation;
    a determining unit that determines decrease in an awakening degree of the driver based on a comparison result between the obtained variation state and a reference;
    a preceding vehicle detecting unit that detects a preceding vehicle; and
    a reference setting unit that sets the reference based on the variation state of the at least one of the vehicle behavior and the driving operation, wherein the at least one is detected while the driver actually drives, wherein the reference includes a first reference under a condition where the preceding vehicle is existing and a second reference under a condition where the preceding vehicle is not existing, according to a detection result of the preceding vehicle detecting unit.

11. The awakening degree determining system of claim 10,
    wherein the reference includes an upper limit of the variation state and a lower limit of the variation state,
    wherein the determining unit determines the decrease in the awakening degree when the obtained variation state falls outside a region between the upper limit and the lower limit.

12. The awakening degree determining system of claim 10,
    wherein the preceding vehicle detecting unit also detects a distance to the preceding vehicle, and
    wherein, when the distance falls within a given region, the changing unit recognizes that the preceding vehicle is detected.

13. The awakening degree determining system of claim 10,
    wherein the reference is set based on a road attribute.

14. The awakening degree determining system of claim 10,
    wherein the vehicle behavior includes at least one of a yaw rate, a vehicle-lateral acceleration, and a vehicle-longitudinal acceleration, and
    wherein the driving operation includes at least one of an accelerator operation, a brake operation, and a steering operation.

15. The awakening degree determining system of any one of claims 10 to 14, further comprising:
    an awakening-degree enhancing unit that enhances the awakening degree of the driver when the determining unit determines the decrease in the awakening degree.

16. An awakening degree determining method used in a vehicle, the awakening degree determining method comprising steps of:
    detecting at least one of a vehicle behavior and a driving operation of a driver on the vehicle, wherein the driving operation varies the vehicle behavior;
    obtaining a variation state of the detected at least one of the vehicle behavior and the driving operation;
    determining decrease in an awakening degree of the driver based on a comparison result between the obtained variation state and a reference; and
    changing the reference based on whether a preceding vehicle is detected or not.

* * * * *